United States Patent
Yilmaz et al.

(10) Patent No.: US 10,098,116 B2
(45) Date of Patent: Oct. 9, 2018

(54) METHOD AND APPARATUS FOR ADAPTIVE BAND SELECTION IN HETEROGENEOUS NETWORKS

(71) Applicant: Nokia Technologies Oy, Espoo (FI)

(72) Inventors: Osman Yilmaz, Helsinki (FI); Mikko Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 122 days.

(21) Appl. No.: 15/031,524

(22) PCT Filed: Oct. 24, 2013

(86) PCT No.: PCT/IB2013/059630
§ 371 (c)(1),
(2) Date: Apr. 22, 2016

(87) PCT Pub. No.: WO2015/059523
PCT Pub. Date: Apr. 30, 2015

(65) Prior Publication Data
US 2016/0262156 A1    Sep. 8, 2016

(51) Int. Cl.
*H04W 72/04* (2009.01)
*H04W 24/02* (2009.01)
(Continued)

(52) U.S. Cl.
CPC ....... *H04W 72/0453* (2013.01); *H04W 24/02* (2013.01); *H04W 72/0486* (2013.01); *H04W 72/082* (2013.01); *H04W 84/045* (2013.01)

(58) Field of Classification Search
None
See application file for complete search history.

(56) References Cited

U.S. PATENT DOCUMENTS

| 8,385,305 B1 | 2/2013 | Negus et al. |
| 2003/0013482 A1 | 1/2003 | Brankovic |

(Continued)

FOREIGN PATENT DOCUMENTS

| EP | 0 969 602 A1 | 1/2000 |
| GB | 2 445 385 A | 7/2008 |
| WO | WO-2007/022564 A1 | 3/2007 |

OTHER PUBLICATIONS

Office Action for Chinese Patent Application No. 201380081829.2 dated Apr. 24, 2017, with English translation, 15 pages.

(Continued)

*Primary Examiner* — Alex Skripnikov
(74) *Attorney, Agent, or Firm* — Alston & Bird LLP

(57) ABSTRACT

A method, apparatus and computer program product are provided to collect a channel information in conjunction with wireless communications; estimate at least one of a line of sight traffic and a non-line of sight traffic on the channel based on channel information; and select, with a processor, a frequency band, wherein the frequency band includes at least a respective frequency or frequency range and a frequency band or plurality of frequency bands and a bandwidth for the respective frequency or frequency range and time allocation for the frequency or frequency range. The selection is based on the estimated line of sight and non-line of sight traffic, wherein the respective frequency band comprises selecting at least one of a first frequency band or a second frequency band with the first and second frequency bands being different from one another.

11 Claims, 4 Drawing Sheets

(51) Int. Cl.
*H04W 72/08* (2009.01)
*H04W 84/04* (2009.01)

(56) References Cited

U.S. PATENT DOCUMENTS

| | | | | |
|---|---|---|---|---|
| 2010/0295731 A1* | 11/2010 | Chong | ............... | G01S 5/0215 |
| | | | | 342/387 |
| 2010/0315289 A1* | 12/2010 | Nurmela | ............... | G01S 11/06 |
| | | | | 342/385 |
| 2013/0095770 A1* | 4/2013 | Moshfeghi | ............ | H04W 88/06 |
| | | | | 455/73 |

OTHER PUBLICATIONS

International Search Report and Written Opinion from International Patent Application No. PCT/IB2013/059630 dated Jun. 12, 2014.
Office Action for Chinese Application No. 201380081829.2 dated Jan. 15, 2018, 8 pages.
Office Action for Chinese Application No. 201380081829.2 dated Jul. 9, 2018, 4 pages.

\* cited by examiner

METHOD AND APPARATUS FOR ADAPTIVE BAND SELECTION IN HETEROGENEOUS NETWORKS

CROSS REFERENCE TO RELATED APPLICATION

This application is a 371 U.S. national phase entry of PCT International Application No. PCT/IB2013/059630, filed Oct. 24, 2013, the entire contents of which are hereby incorporated by reference.

TECHNOLOGICAL FILED

An example embodiment of the present invention relates generally to adaptive band selection in heterogeneous networks and, more particularly, to dynamic adaptive band selection based on line of sight and non-line of sight traffic.

BACKGROUND

Traditionally, mobile communication services use spectral resources below 6 gigahertz (GHz), but the expansion of mobile communication services has made this part of the spectrum highly crowded. Developments in communications technology are rapidly adding to the demand within this spectrum, which is expected to grow to nearly ten times the available spectrum. For example, multiple users simultaneously streaming uncompressed interactive high quality three dimensional (3D) visual content will need much larger spectrum resources than web browsing, email, phone calls, or the like.

Expansion of the available frequency range to to a higher frequency range such as above 6 GHz or 30 GHz, to offload a portion of traffic may help to reduce the traffic load, but frequencies higher frequencies have much less desirable propagation characteristics. This drop in propagation characteristics at higher frequencies severely limits the coverage area of such systems.

Additionally, the operation of multiple transceivers for operation in a low frequency, such as the sub-6 GHz range and at a high frequency, such as above 6 GHz simultaneously increases the energy required for operations and requires multiple licensed bands. Moreover, some transceiver units may have limited transceiver resources making simultaneous operation in the sub-6 GHz range and above 6 GHz challenging.

BRIEF SUMMARY

A method, apparatus and computer program product are provided in accordance with an example embodiment in order to facilitate the dynamic adaptive band selection in heterogeneous networks. As such, transceiver traffic may be monitored to determine the transceivers to operate and/or on the frequency band(s) on which the transceivers should be operated. The selection of frequency or frequency range and/or a frequency band or plurality of frequency bands and/or a bandwidth for the respective frequency or frequency range and/or time allocation for the frequency or frequency range may be based on at least one of the amount of transceiver traffic that is line-of-sight (LOS) or has a probability of being LOS, and the amount of traffic that is non-line-of-sight (NLOS). In an example embodiment, a method is provided that includes collecting a channel information in conjunction with wireless communications; estimating at least one of a line of sight traffic and a non-line of sight traffic on the channel based on channel information; and selecting, with a processor, a frequency band, wherein the frequency band comprises at least a respective frequency or frequency range and a frequency band or plurality of frequency bands and a bandwidth for the respective frequency or frequency range and time allocation for the frequency or frequency range based on the estimated line of sight and the estimated non-line of sight traffic, wherein the respective frequency band comprises selecting at least one of a first frequency band or a second frequency band with the first and second frequency bands being different from one another.

The method of an example embodiment may also include determining if at least one of the line of sight traffic or the non-line of sight traffic satisfies a threshold. In this regard, the method may select the respective frequency band by selecting the respective frequency band based upon whether the threshold is satisfied. The method of an example embodiment may also include determining if the line of sight traffic on the channel satisfies a first threshold. In this regard, the method may select the respective frequency band by selecting the respective frequency band based upon whether the line of sight traffic on the channel satisfies the first threshold.

The method of an example embodiment may also include determining if the non-line of sight traffic on the channel satisfies a second threshold. The method of this embodiment may select the respective frequency band by selecting the respective frequency band based upon whether the non-line of sight traffic on the channel satisfies the second threshold. The method of an example embodiment may also include deenergizing a non-selected transceiver based on the first or second frequency band not being selected. The method of an example embodiment may also include determining an available bandwidth. In this embodiment, the method may select a respective frequency band based on available bandwidth. The method of an example embodiment may also include determining a level of interference in the first and second frequency bands. The method of this example embodiment may select a respective frequency band based on the level of interference in the first and second frequency bands. In another example embodiment, an apparatus is provided that includes at least one processor and at least one memory including computer program code with the memory and computer program code configured to, with the processor, cause the apparatus to collect a channel information in conjunction with wireless communications; estimate at least one of a line of sight traffic and a non-line of sight traffic on the channel based on channel information; and select, with a processor, a frequency band, wherein the frequency band comprises at least a respective frequency or frequency range and a frequency band or plurality of frequency bands and a bandwidth for the respective frequency or frequency range and time allocation for the frequency or frequency range based on the estimated line of sight and the estimated non-line of sight traffic, wherein the respective frequency band comprises selecting at least one of a first frequency band or a second frequency band with the first and second frequency bands being different from one another.

The at least one memory and computer program code may be further configured to, with the processor, cause the apparatus of an example embodiment to determine if at least one of the line of sight traffic or the non-line of sight traffic satisfies a threshold. In this regard the at least one memory and computer program code maybe configured to, with the processor, cause the apparatus to select the respective frequency band comprises selecting the respective frequency band based upon whether the threshold is satisfied. The at least one memory and computer program code may be further configured to, with the processor, cause the apparatus of an example embodiment to determine if the line of sight traffic on the channel satisfies a first threshold. In this regard the at least one memory and computer program code maybe configured to, with the processor, cause the apparatus to select the respective frequency band comprises selecting the respective frequency band based upon whether the line of sight traffic on the channel satisfies the first threshold.

The at least one memory and computer program code may be further configured to, with the processor, cause the apparatus of an example embodiment to determine if the non-line of sight traffic on the channel satisfies a second threshold In this regard the at least one memory and computer program code maybe configured to, with the processor, cause the apparatus to selecting the respective frequency band comprises selecting the respective frequency band based upon whether the non-line of sight traffic on the channel satisfies the second threshold.

The at least one memory and computer program code may be further configured to, with the processor, cause the apparatus of an example embodiment to determining an available bandwidth. The at least one memory and computer program code maybe configured to, with the processor, cause the apparatus to select a respective frequency band further includes based on available bandwidth. The at least one memory and computer program code may be further configured to, with the processor, cause the apparatus of an example embodiment to determine a level of interference in the first and second frequency bands. The at least one memory and computer program code maybe configured to, with the processor, cause the apparatus to select a respective frequency band further includes based on the level of interference in the first and second frequency bands.

In a further embodiment, a computer program product is provided that includes at least one non-transitory computer readable medium having program code portions stored thereon with the program code portions configured, upon execution, to collect a channel information in conjunction with wireless communications; estimate at least one of a line of sight traffic and a non-line of sight traffic on the channel based on channel information; and select, with a processor, a frequency band, wherein the frequency band comprises at least a respective frequency or frequency range and a frequency band or plurality of frequency bands and a bandwidth for the respective frequency or frequency range and time allocation for the frequency or frequency range based on the estimated line of sight and the estimated non-line of sight traffic, wherein the respective frequency band comprises selecting at least one of a first frequency band or a second frequency band with the first and second frequency bands being different from one another. The computer-executable program code portions of an example embodiment may also include program instructions for determining if at least one of the line of sight traffic or the non-line of sight traffic satisfies a threshold. The program code portions configured to select a respective frequency band may include program code portions configured to select the respective frequency band based upon whether the threshold is satisfied. The computer-executable program code portions of an example embodiment may also include program instructions for determining if the line of sight traffic on the channel satisfies a first threshold. The program code portions configured to select a respective frequency band may include program code portions configured to select the respective frequency band based upon whether the line of sight traffic on the channel satisfies the first threshold.

The computer-executable program code portions of an example embodiment may also include program instructions for determining if the non-line of sight traffic on the channel satisfies a second threshold. The program code portions configured to select a respective frequency band may include program code portions configured to select the respective frequency band based upon whether the non-line of sight traffic on the channel satisfies the second threshold. The computer-executable program code portions of an example embodiment may also include program instructions for deenergizing a non-selected transceiver based on the first or second frequency band not being selected.

The computer-executable program code portions of an example embodiment may also include program instructions for determining an available bandwidth. The program code portions configured to select a respective frequency band may include program code portions configured to select a respective frequency band based on available bandwidth. The computer-executable program code portions of an example embodiment may also include program instructions for determine a level of interference in the first and second frequency bands. The program code portions configured to select a respective frequency band may include program code portions configured to select a respective frequency band based on the level of interference in the first and second frequency bands.

In yet another example embodiment, an apparatus is provided that includes means for collecting channel information in conjunction with wireless communications; means for estimating a line of sight traffic on the channel based on channel information; means for estimating a non-line of sight traffic on the channel based on channel information; and means for selecting a respective frequency band based on the estimated line of sight and non-line of sight traffic. The means for selecting the respective frequency band may include means for selecting at least one of a first frequency band or a second frequency band with the first and second frequency bands being different from one another.

BRIEF DESCRIPTION OF THE SEVERAL VIEWS OF THE DRAWINGS

Figure 1:
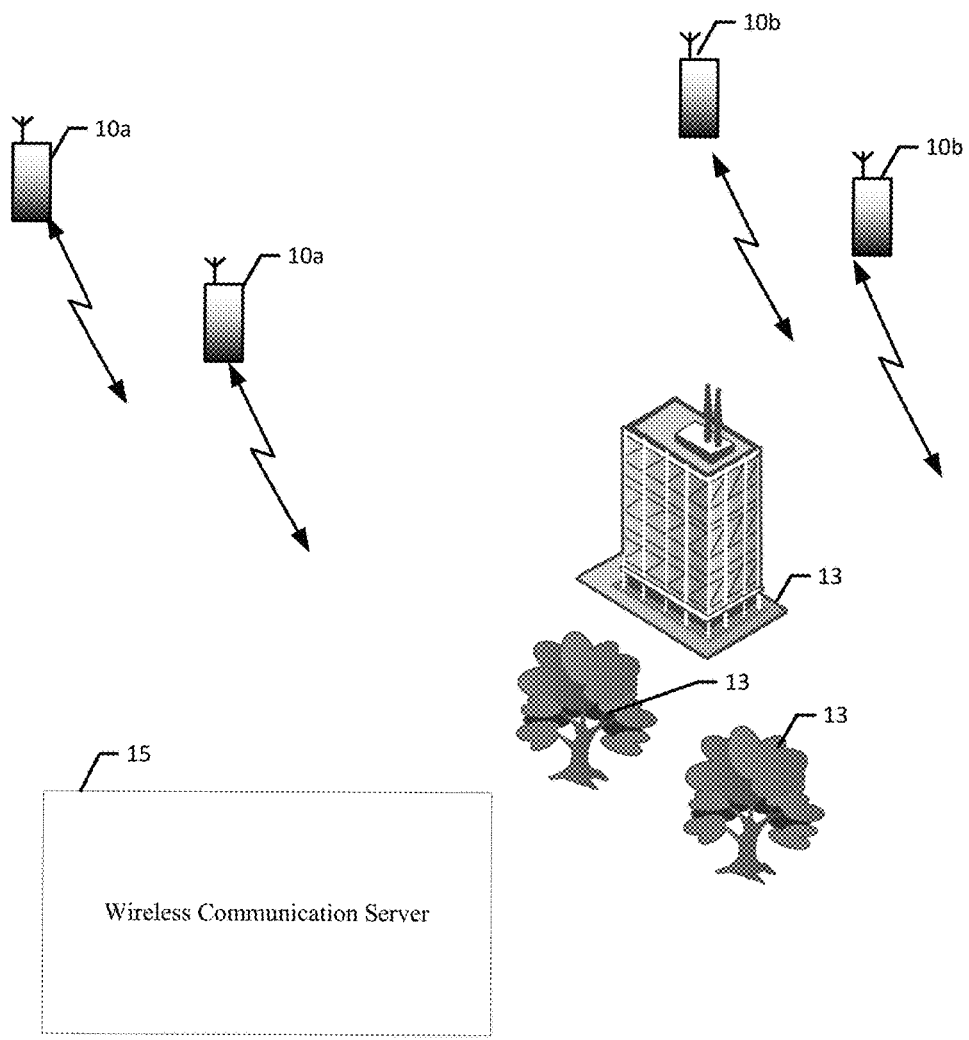
Figure 2:
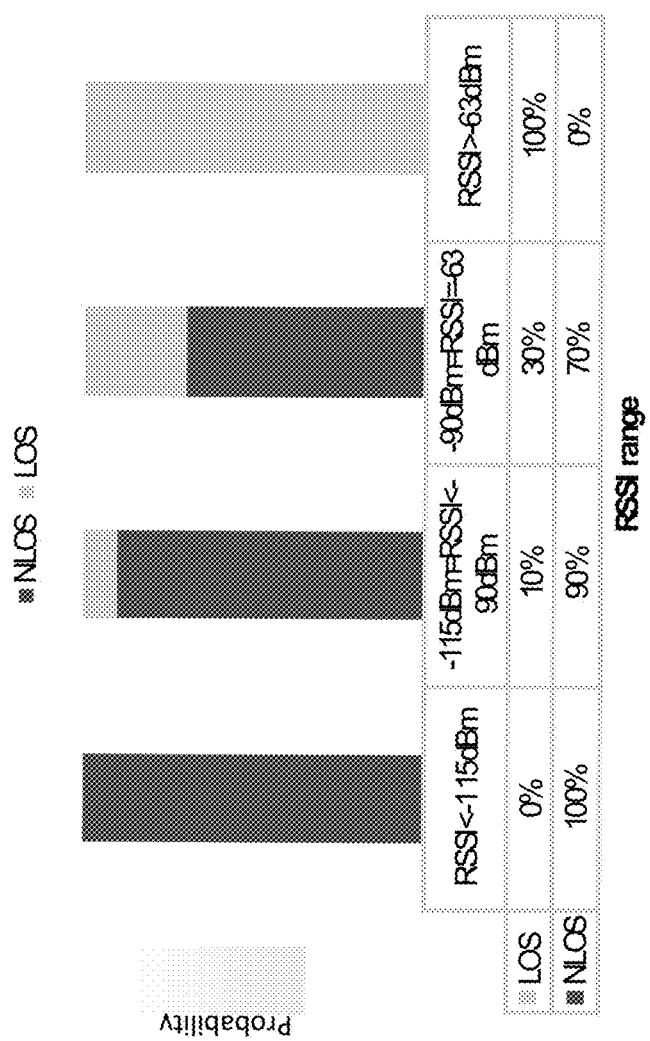
Figure 3:
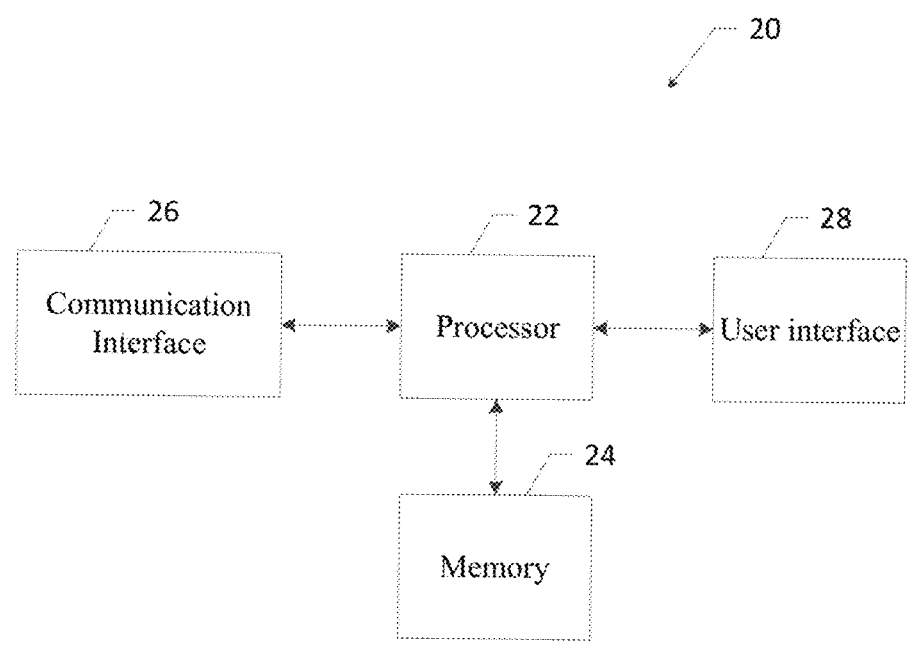
Figure 4:
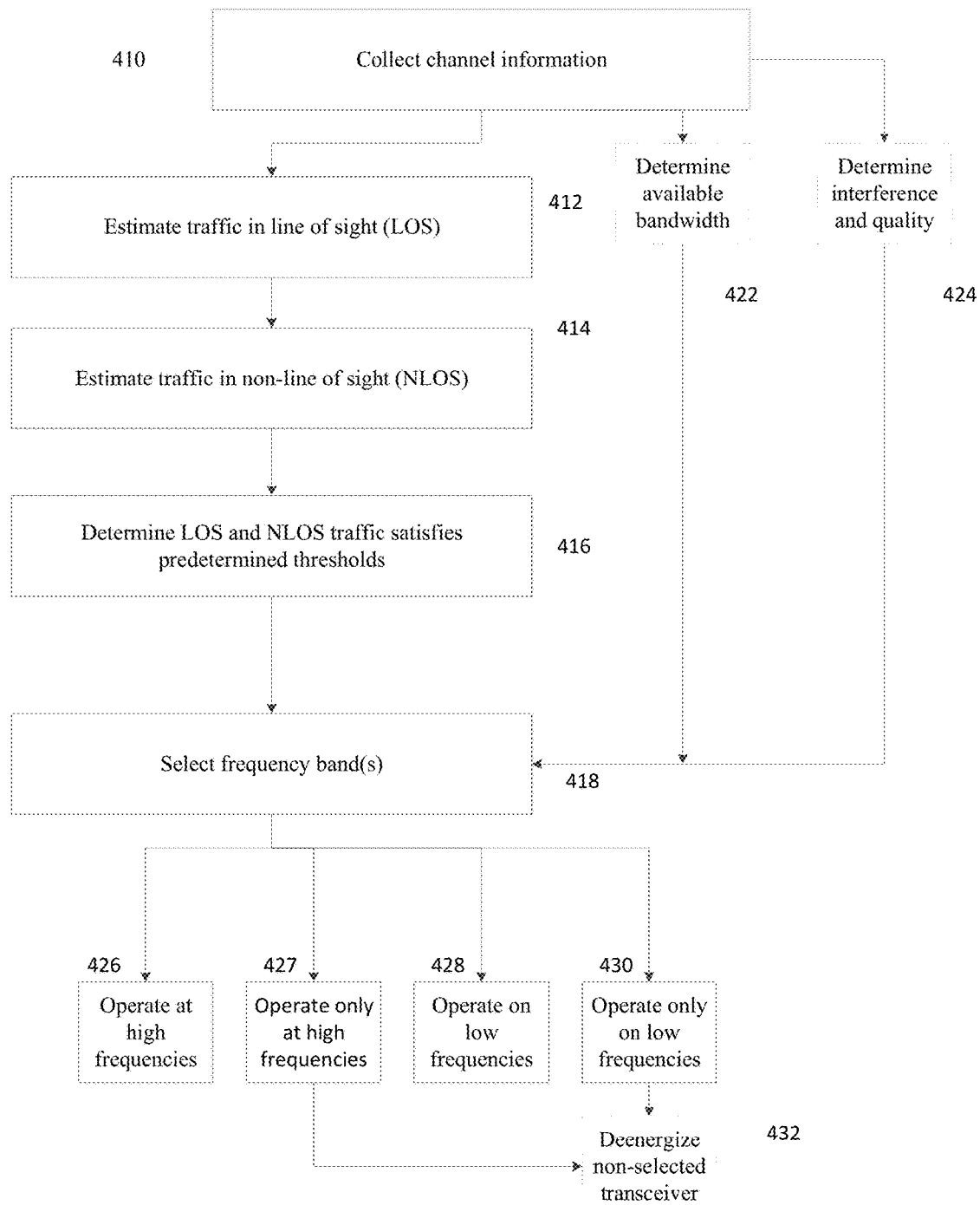

Having thus described example embodiments of the invention in general terms, reference will now be made to the accompanying drawings, which are not necessarily drawn to scale, and wherein:

FIG. 1 is a schematic representation of a plurality of user devices in communication with a wireless communication server in accordance with an example embodiment of the present invention;

FIG. 2 is a bar graph of channel traffic distribution inference based on reference signal strength indicator in accordance with an example embodiment of the present invention assuming 1 mW transmission power;

FIG. 3 is a block diagram of an apparatus that may be specifically configured for adaptive band selection in heterogeneous networks in accordance with an example embodiment of the present invention; and FIG. 4 is a flow chart illustrating the operations performed, such as by the apparatus of FIG. 3, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment for dynamic adaptive band selection by a wireless communication server 15 based of download/uplink traffic on a communication channel with user equipment 10. A wireless communication server 15 may collect and measure the channel information and select a frequency band. The wireless communication server 15 of an example embodiment may estimate the amount of channel traffic that is line of sight (LOS) and non-line of sight (NLOS) and compare the LOS and NLOS traffic composition to a set of predetermined thresholds. The wireless communication server may determine to operate or not to operate a transceiver and/or may determine what frequency band on which to operate a transceiver based on the channel traffic threshold determinations.

The communication channels may be established between the wireless communication server 15 and the user equipment 10. For example, FIG. 1 depicts the communication channel between the user equipment and the wireless communication server 15 in various conditions. In an instance in which the communication channel transmissions are unobstructed or relatively unobstructed, the user equipment 10a and wireless communication server may operate on higher frequencies (e.g. above 6 GHz (millimeter wave bands)) without diminished propagation or coverage. However where there are obstructions 13 between the user equipment 10b and the wireless communication server 15, the user equipment and wireless communication server may operate on low frequencies (e.g. sub-6 GHz). Obstructions 13 may take a variety of forms such as buildings, trees, land masses, or the like.

The judicious selection or adjustment of spectrum band operation by the wireless communication server 15 in accordance with an example embodiment may prevent or at least reduce instances of off-loading failure, if a single operation band is used; or excess energy consumption, if parallel operation band is used.

As noted above, the method, apparatus and computer program product of an example embodiment may collect and measure channel information. Channel information may include, without limitation, attenuation, phase change and/or delay in a received signal to the transmitted signal, due to traversing the radio channel between the wireless communication server 15 and the user equipment 10. As described below, the wireless communication server 15 may then estimate the channel traffic distribution between the wireless communication server 15 and user equipment 10 as LOS and NLOS and make selections of respective frequency bands based on the channel traffic distribution.

FIG. 2 illustrates a chart of received signal strength index (RSSI) compared to the probable channel distribution characteristics in a winner channel model assuming a 1 mW transmission power. RSSI may be one of several comparisons made by the wireless communication server 15 to make a probability inference of LOS or NLOS transmissions over the transceiver. The RSSI is correlated with a probability of obstruction and attenuation in signal strength and quality. In an instance in which the RSSI is less than a first threshold, such as −115 dBm, the wireless communication server 15 may determine that the channel traffic distribution is one hundred percent NLOS. Where the RSSI is between the first threshold of −115 dBm and a second threshold, such as −90 dBm, the wireless communication server 15 may infer that the channel traffic distribution is ten percent LOS and ninety percent NLOS. Where RSSI is between the second threshold of −90 dBm and a third threshold, such as −63 dBm, the wireless communication server 15 may infer that the channel traffic distribution is thirty percent LOS and seventy percent NLOS. In an instance in which the RSSI is greater than the third threshold of −63 dBm the wireless communication server 15 may infer that the channel traffic distribution is 100 percent LOS. Although specific percentages of LOS and NLOS are provided above, these specific percentages are provided by way of example and the wireless communication server 15 may be configured to infer different percentages of LOS and NLOS in other embodiments. In an instance in which the collected or measured channel information indicates that the wireless communication server 15 traffic is largely LOS users, e.g., a majority of LOS users, the wireless communication server may operate high frequency (mmW) bands. If the wireless communication server 15 determines that the channel information indicates a smaller amount of user traffic is LOS, e.g., a minority of LOS users, the wireless communication server may be not transmit or may deenergize a non-selected transceiver.

The above RSSI channel traffic determination of LOS and NLOS channel traffic distribution is an example of channel traffic determination logic, and it should be appreciated that the wireless communication sever 15 may determine channel traffic by analysis of other channel condition traffic information metrics or combinations of channel condition traffic information metrics. Further the RSSI ranges and values, above, for both RSSI and percentages of LOS and NLOS traffic are examples of ranges and values that may be used, and it should be appreciated that other ranges and values may be used by the wireless communication server 15 to determine channel traffic distribution. The channel condition traffic information metrics generated by users may include, without limitation, RSSI, root-mean-squared (RMS) delay spread, the proportion of channel impulse response (CIR) energy in the first tap, and the like in determining the LOS and NLOS channel traffic distribution.

Additionally, in regards to the determination for adaptive selection of a frequency band, the wireless communication server 15 may be configured to analyze the availability of bandwidth, resources, level of interference at the low and high frequency portions of the spectrum, or the like.

The wireless communication server 15, such as a base station, a cellular communication transceiver or the like, may include or otherwise be associated with an apparatus 20 as shown in FIG. 3. The apparatus, such as that shown in FIG. 3, is specifically configured in accordance with an example embodiment of the present invention to provide for dynamic adaptive band selection in heterogeneous networks based on line of sight and non-line of sight traffic. The apparatus may include or otherwise be in communication with a processor 22, a memory device 24, a communication interface 26 and an optional user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a wireless communication server 15. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include a communication interface 26 that may be any means such as a device or circuitry embodied in either hardware or a combination of hardware and software that is configured to receive and/or transmit data from/to a communications device in communication with the apparatus, such as to facilitate communications with one or more user equipment 10 or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 20 may also optionally include a user interface 28 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Referring now to FIG. 4, the operations performed, such as by the apparatus 20 of FIG. 3, in order to adaptively select an operation band based on channel traffic distribution are illustrated. As shown in block 410 of FIG. 4, the apparatus may include means, such as the processor 22 or the like, for collecting and measuring channel information. The channel information may be determined in a various manners. In one example embodiment, the apparatus, such as the processor, may measure channel information obtained from the values of parameters that represent attenuation, phase change and delay in the received signal relative to the transmitted signal, due to traversing the radio channel between the transmitter and the receiver. The values that the processor 22 may measure for channel information may comprise, without limitation, RSSI, RMS, CIR energy in the first tap, or the like.

As shown in block 412 of FIG. 4, the apparatus 20 may include means, such as a processor 22 or the like, for estimating the portion of channel traffic distribution that is LOS. As illustrated in FIG. 2, the processor 22 compares parameter values, such as RSSI, RMS, and CIR to predetermined values or bands in order to determine the portion of the channel traffic distribution that is LOS. The processor 22 of an example embodiment may be configured to determine the portion of channel traffic that is LOS by the range in which the parameter values are within. For example, if the RSSI parameter value is between −90 dBm and −63 dBm the processor 22 would determine that the LOS traffic was 30 percent of the traffic distribution. In an alternative example embodiment the processor 22 may be configured to receive low frequency measurement reports from the user equipment 10.

As shown in block 414 of FIG. 4, the apparatus 20 may include a means, such as a processor 22 or the like, for estimating the portion of channel traffic distribution that is NLOS. As illustrated in FIG. 2, the processor 22 compares parameter values, such as RSS, RMS and CIR to predetermined values or bands in order to determine the portion of the channel traffic distribution that is NLOS. The processor 22 of an example embodiment may be configured to determine the portion of channel traffic that is NLOS by the range in which the parameter values are within. The percentage of LOS and NLOS traffic based upon the relationship of parameter values to the ranges are provided in FIG. 2 and referenced here by way of example and it should be appreciated that the percentage of LOS and NLOS traffic, parameter values and ranges, or the like may be defined to have other values in other embodiments.

Alternatively, in an instance in which the total traffic is comprised solely of LOS traffic and NLOS traffic, the LOS or NLOS channel traffic distribution may be determined by estimating either the LOS or NLOS channel traffic in accordance with operations 412 and 414, respectively, and then subtracting that estimated value form the total traffic value to estimate the other one of the LOS or NLOS channel traffic. In an instance in which the processor 22 estimates that the LOS channel traffic may be 75 percent of 100 the channel traffic. The processor 22 may determine the difference to be 25 percent NLOS. In an instance in which the processor 22 estimates the NLOS channel traffic may be 45 percent, the difference may be determined to be 65 percent LOS channel traffic.

As shown at block 416 of FIG. 4, the apparatus 20 may include means, such as the processor 22 or the like, for determining if the LOS and NLOS values satisfy a predetermined value and selecting a respective frequency band based upon that determination. The processor 22 of an example embodiment may compare the LOS traffic value to a first threshold value. If the LOS traffic value is satisfies, for example, is greater than, the first threshold value the processor may determine that a first frequency band, such as a high frequency band, is desired. The processor 22 of this example embodiment may compare the NLOS traffic value to a second threshold value. If the NLOS traffic value satisfies, for example, is greater than, the second threshold value the processor 22 may determine that a second frequency band, such as a low frequency band, is desired. The processor 22 of this example embodiment may also compare the LOS traffic value to a third threshold value. If the LOS traffic value satisfies, for example, is less than, the third threshold value, the processor may to operate only at a low frequency band.

As shown in block 422 of FIG. 4, the apparatus 20 may include means, such as the processor 22 or the like, for determining available bandwidth. The processor 22 may determine the portion of the available band width that is in use and compare the used bandwidth value to total bandwidth available. The available bandwidth is the difference between the total available bandwidth and the bandwidth in use. The processor 22 may use the determination of available bandwidth to determine if frequency band tuning (e.g., to the low frequency band) would improve the performance of the apparatus 20.

The processor 22 may optimize the frequency selection based on the signal traffic information, such as the percent of LOS and NLOS. The processor 22 of this example embodiment may analyze the current and expected signal traffic, such as may either be a known value (e.g. buffer status) or an estimated future value (e.g. machine learning). The signal traffic information may include without limitation relative bandwidth, interference, signal quality, LOS, NLOS, or the like. The processor 22 may use the traffic information to determine if current and future signal traffic needs can be fulfilled. In an instance in which the signal traffic needs cannot be fulfilled, the processor 22 may adjust frequency band tuning to accommodate the signal traffic needs. As shown in block 424 of FIG. 4, the apparatus 20 may include means, such as the processor 22 or the like, for determining the level of interference and quality of the first and second, e.g., high and low, frequency bands. Measurements of signal quality and interference may be performed by user equipment 10 and transmitted to the apparatus 20 or network, or may be performed directly by the processor 22, the communications interface 26 or the like. The processor 22 may determine the signal quality of the serving apparatus (e.g. in terms of RSSI, Reference Signal Received Quality (RSRQ), and Channel Quality Indicator (CQI)). The processor 22 may determine the interference of neighbor or overlaying apparatus 20 e.g. in terms of RSSI and Reference Signal Received Power (RSRP)). The processor 22 may use the determination of interference and quality of the first and second, e.g., high and low, frequency operation bands to determine if frequency band tuning (e.g. to the low frequency band) would improve the performance of the apparatus 20 as discussed in block 422 of FIG. 4.

As shown in block 418 of FIG. 4, the apparatus 20 may include means, such as the processor 22, or the like for selecting a frequency band. The processor may be configured to analyze the channel traffic threshold determinations made at operations 414 and 416 to select the operation band based on the preferred frequency bands, based on the LOS and NLOS channel traffic distribution. In alternative example embodiments the channel traffic threshold determinations are based on LOS or NLOS traffic estimations. Additionally, the processor 22 may select low (e.g. current cellular bands such as less than 6 Ghz), high (e.g. mmW bands, such as greater than 6 Ghz, or low and high frequency bands to improve performance based on the bandwidth determination at 422. A frequency band may be a contiguous frequency band or comprise several non-contiguous frequency bands that may be close in frequencies. The processor may also be configured to adjust or select time allocations for each frequency band. The processor 22 may also be selected low, high, or low and high frequency bands to improve performance, based on the interference and quality determination at 424 as discussed in block 422 of FIG. 4.

The processor 20 may maintain the transmission range by tuning the transmission power level inversely proportional to change in frequency. In an instance in which the apparatus 20 may be operating in a high frequency band and the processor 22 selects low frequency operation, the processor may raise the power inversely proportional to the reduction in frequency to maintain the same transmission range.

In another example embodiment, the processor may assign weights to factors that determine the selection of operation band(s). For example the threshold determination of operation 416 may have a high weight, such as, 80 percent, but is not determinative. Weights may be assigned to available bandwidth and interference and quality determinations such as 10 percent each. The processor 22 may then weight the determinations as factors to select low, high, or low and high frequency band. In an instance in which the processor has a threshold determination at operation 416 of 100 percent high frequency band with a factor of 0.8, an available band width request to shift traffic to low frequency band with a factor of 0.1, and a channel interference and quality determination request to shift traffic to a low frequency band with a factor of 0.1, the processor may select 80 percent of the traffic on the high frequency band and 20 percent traffic on the low frequency band.

The apparatus 20 may include means, such as the processor 22 or the like, for operation of the communication interface 26 at a low, high or low and high frequency band. The processor 22 operates the communication interface 26 in the low, high, or low and high frequency band that has been selected at 418. Operations 426, 427, 428, and 430 below are example embodiments of operating the communications interface 26.

As shown in block 426 of FIG. 4, the apparatus 20 may include means, such as the processor 22 or the like, for operating the communication interface 26 at a high frequency band. When the processor 22 selects high frequency band operation, the processor may operate the communications interface at the high frequency band.

As shown in block 430 of FIG. 4, the apparatus 20 may include means, such as the processor 22, or the like for operating the communication interface 26 at only a high frequency band. When the processor 22 selects only high frequency band operation, the processor may operate the communication interface at only the high frequency band.

As shown in block 428 of FIG. 4, the apparatus 20 may include means, such as the processor 22, or the like for operating the communications interface at a low frequency band. When the processor 22 selects low frequency band operation, the processor may operate the communications interface at the low frequency band.

As shown in block 430 of FIG. 4, the apparatus 20 may include means, such as the processor 22, or the like for operating the communication interface 26 at only a low frequency band. When the processor 22 selects only low frequency band operation, the processor may operate the communication interface at only the low frequency band.

As shown in block 432 of FIG. 4, the apparatus 20 may include means, such as the processor 22, or the like for deenergizing the non-selected transceiver. For example, in an instance in which the processor selects to use the high or low frequency band exclusively, the processor may deenergize a non-selected transceiver to conserve energy. In another embodiment the processor 22 may deenergize a non-selected transceiver only if the selected receiver traffic satisfies a predetermined threshold.

In an example embodiment, the processor 20 will determine the percentage of channel traffic that is LOS and NLOS. In an instance in which the processor determines the channel traffic is 100 percent LOS, the processor may operate the communication interface 26 in only the high frequency band; or may largely operate in the high frequencies either in frequency (larger band allocation) or time domain (larger reception/transmission subframe allocation). In an instance in which the processor 22 determines that the channel traffic is 100 percent NLOS the processor may operate the communication interface 26 in only the low frequency band; or may largely operate in the low frequencies either in frequency (larger band allocation) or time domain (larger reception/transmission subframe allocation). In an instance in which the processor has determined that the channel communication is both LOS and NLOS, the processor may operate the communication interface 26 in both the low and high frequency band and distribute the traffic proportionally to the LOS (high) and NLOS (low) channel traffic. As the foregoing example demonstrates, the adaptive selection of a frequency band by the method, apparatus and computer program product of an example embodiment allows the apparatus to offload communications traffic to a higher frequency band, thus increasing the available bandwidth of the lower frequency band. The example embodiment may also allow the apparatus to reduce the operating time of transceivers that are not selected and therefore reduce energy consumption.

As described above, FIG. 4 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 422, 424, and 432 in FIG. 4. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   collecting a channel information in conjunction with wireless communications;
   estimating at least one of a line of sight traffic and a non-line of sight traffic on a channel based on the channel information;
   determining if the line of sight traffic on the channel satisfies a first threshold;
   determining if the non-line of sight traffic on the channel satisfies a second threshold; and
   selecting, with a processor, a frequency band, wherein the frequency band comprises one or more frequency bands, wherein selecting the frequency band comprises selecting a time allocation for each of the one or more frequency bands based on at least one of the estimated line of sight traffic and an the estimated non-line of sight traffic, and wherein selecting the frequency band further comprises selecting at least one of a first frequency band or a second frequency band with the first and second frequency bands being different from one another,
   wherein selecting the frequency band comprises selecting the frequency band based upon whether the line of sight traffic on the channel satisfies the first threshold and also based upon whether the non-line of sight traffic on the channel satisfies the second threshold.

2. A method according to claim 1 further comprising:
   deenergizing a non-selected transceiver based on the first or second frequency band not being selected.

3. A method according to claim 1 further comprising:
   determining an available bandwidth; and
   wherein the selecting a frequency band is based on the available bandwidth.

4. A method according to claim 1 further comprising:
   determining a level of interference in the first and second frequency bands; and
   wherein the selecting a frequency band is based on the level of interference in the first and second frequency bands.

5. An apparatus comprising at least one processor and at least one memory including computer program code, the at least one memory and computer program code configured to, with the processor, cause the apparatus to:
   collect a channel information in conjunction with wireless communications;
   estimate at least one of a line of sight traffic and a non-line of sight traffic on a channel based on the channel information;
   determine if the line of sight traffic on the channel satisfies a first threshold;
   determine if the non-line of sight traffic on the channel satisfies a second threshold; and
   select, with a processor, a frequency band, wherein the frequency band comprises one or more frequency bands, wherein the apparatus is caused to select the frequency band by selecting a time allocation for each of the one or more frequency bands based on the estimated line of sight and the estimated non-line of sight traffic, wherein the apparatus is further caused to select the frequency band by selecting at least one of a first frequency band or a second frequency band with the first and second frequency bands being different from one another,
   wherein the apparatus is caused to select the frequency band by selecting the frequency band based upon whether the line of sight traffic on the channel satisfies the first threshold and also based upon whether the non-line of sight traffic on the channel satisfies the second threshold.

6. An apparatus according to claim 5 wherein the at least one memory and computer program code are further configured to, with the processor, cause the apparatus to:
   deenergize a non-selected transceiver based on the first or second frequency band not being selected.

7. An apparatus according to claim 5 wherein the at least one memory and computer program code are further configured to, with the processor, cause the apparatus to:
   determining an available bandwidth; and
   wherein the selecting a frequency band is based on the available bandwidth.

8. An apparatus according to claim 5 wherein the at least one memory and computer program code are further configured to, with the processor, cause the apparatus to:
    determine a level of interference in the first and second frequency bands; and
wherein the selecting a frequency band is based on the level of interference in the first and second frequency bands.

9. A computer program product comprising a non-transitory computer readable medium having program code portions stored thereon, the program code portions configured, upon execution to:
    collect a channel information in conjunction with wireless communications;
    estimate at least one of a line of sight traffic and a non-line of sight traffic on a channel based on the channel information;
    determine if the line of sight traffic on the channel satisfies a first threshold;
    determine if the non-line of sight traffic on the channel satisfies a second threshold; and
    select, with a processor, a frequency band, wherein the frequency band comprises one or more frequency bands, wherein the program code portions are configured, upon execution, to select the frequency band by selecting a time allocation for each of the one or more frequency or frequency range bands based on the estimated line of sight and the estimated non-line of sight traffic, wherein the program code portions are further configured, upon execution, to select the frequency band by selecting at least one of a first frequency band or a second frequency band with the first and second frequency bands being different from one another,
    wherein the program code portions are configured, upon execution, to select the frequency band by selecting the frequency band based upon whether the line of sight traffic on the channel satisfies the first threshold and also based upon whether the non-line of sight traffic on the channel satisfies the second threshold.

10. A computer program product according to claim 9 wherein the program code portions are further configured, upon execution, to
    determining an available bandwidth; and
    wherein the selecting a frequency band is based on the available bandwidth.

11. A computer program product according to claim 9 wherein the program code portions are further configured, upon execution, to
    determine a level of interference in the first and second frequency bands; and
    wherein the selecting a frequency band is based on the level of interference in the first and second frequency bands.

\* \* \* \* \*

UNITED STATES PATENT AND TRADEMARK OFFICE
CERTIFICATE OF CORRECTION

PATENT NO. : 10,098,116 B2
APPLICATION NO. : 15/031524
DATED : October 9, 2018
INVENTOR(S) : Yilmaz et al.

Page 1 of 1

It is certified that error appears in the above-identified patent and that said Letters Patent is hereby corrected as shown below:

In the Claims

Column 15,
Line 26, Claim 9 "frequency or frequency range bands" should read --frequency bands--.

Signed and Sealed this
Twenty-sixth Day of February, 2019

Andrei Iancu
*Director of the United States Patent and Trademark Office*